United States Patent [19]
Dechantsreiter et al.

[11] 3,830,379

[45] Aug. 20, 1974

[54] AUTOMATIC WAREHOUSE CRANE

[75] Inventors: Max J. Dechantsreiter; Frederic W. Rau, both of Milwaukee, Wis.

[73] Assignee: Harnischfeger Corporation, West Milwaukee, Wis.

[22] Filed: Feb. 24, 1972

[21] Appl. No.: 229,070

[52] U.S. Cl............................................ 214/16.4 A
[51] Int. Cl............................................... B65g 1/06
[58] Field of Search................... 214/16.4 A, 16.4 B

[56] References Cited
UNITED STATES PATENTS

| | | | |
|---|---|---|---|
| 2,941,738 | 6/1960 | Burke et al. | 214/16.4 A |
| 3,402,836 | 9/1968 | Debrey et al. | 214/16.4 A |
| 3,503,530 | 4/1970 | Buich et al. | 214/16.4 A |
| 3,562,514 | 2/1971 | Brand | 214/16.4 X |
| 3,646,890 | 3/1972 | Snyder | 214/16.4 X |
| 3,662,860 | 5/1972 | Burch | 214/16.4 X |
| 3,691,398 | 9/1972 | Burch | 214/16.4 X |
| 3,701,442 | 10/1972 | Dunning | 214/16.4 |

FOREIGN PATENTS OR APPLICATIONS

| | | | |
|---|---|---|---|
| 982,148 | 2/1965 | Great Britain | 214/16.4 A |
| 1,008,071 | 10/1965 | Great Britain | 214/16.4 A |

*Primary Examiner*—Robert G. Sheridan
*Assistant Examiner*—R. B. Johnson
*Attorney, Agent, or Firm*—James E. Nilles

[57] ABSTRACT

An automatic warehouse system comprises stationary load storage racks, each rack having a plurality of storage stations arranged in horizontal rows and vertical columns, and a movable load carrier cooperable therewith. The load carrier comprises a horizontally movable base or bridge, a vertically movable carriage mounted on the bridge, and one or more laterally movable shifters mounted on the carriage. The bridge, carriage and shifter are driven by individual electric motors. Control means, selectively operable in the manual, semi-automatic or automatic mode, control movement of the load carrier between a pick-up and delivery (or home) station and any desired storage station.

The control means comprises means for sensing whether a load is properly disposed on the shifter and for preventing bridge and carriage movement if it is not.

The control means further comprises means for accurately positioning the bridge with the carriage thereon adjacent a particular vertical column of storage station.

The control means further comprises means for accurately positioning the carriage adjacent a particular horizontal row of storage stations.

The control means also comprises means for sensing, whether a particular storage station is already occupied and unable to receive a load.

The control means finally comprises means for moving the shifter to any one of a plurality of positions at a particular storage station to store or retrieve loads thereat.

5 Claims, 18 Drawing Figures

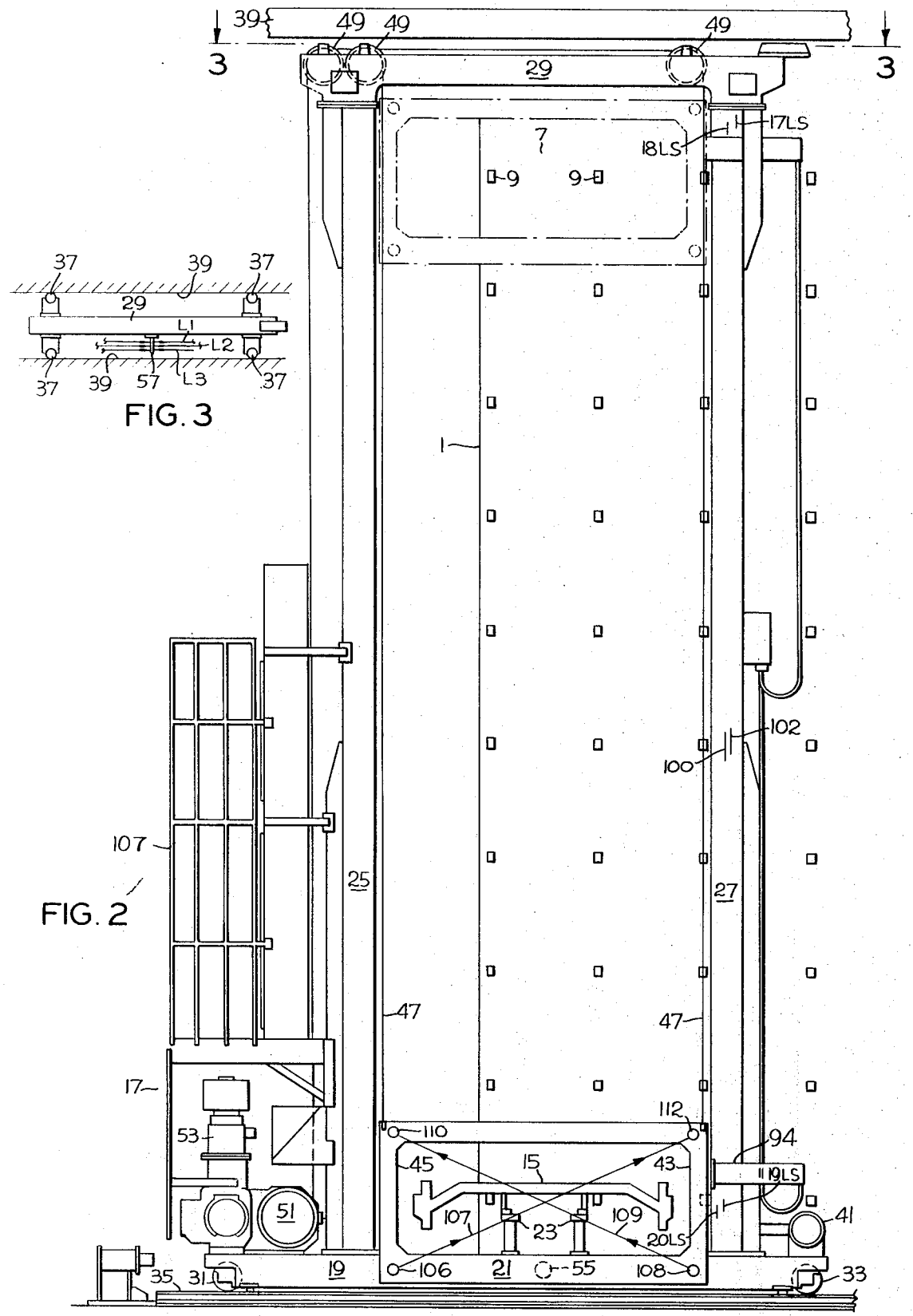

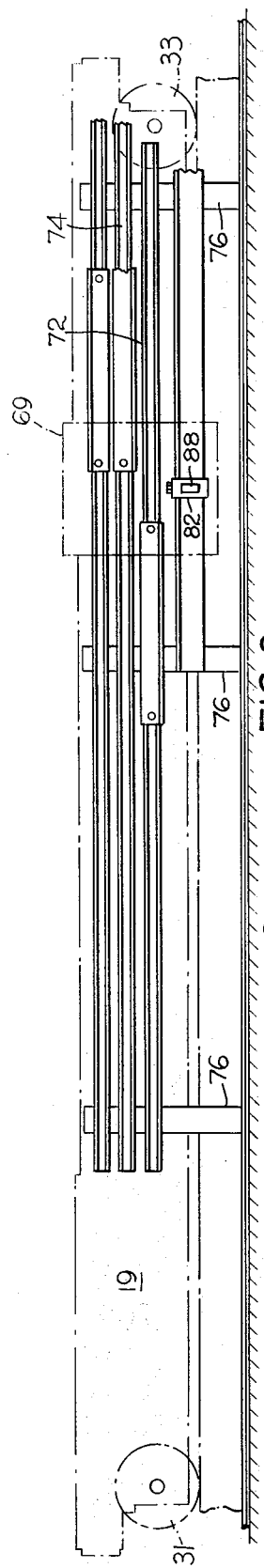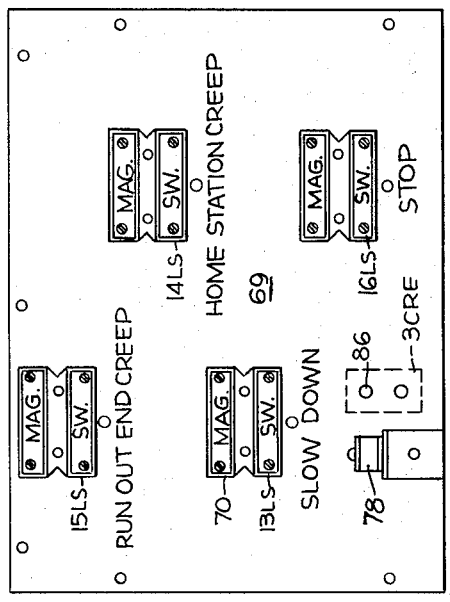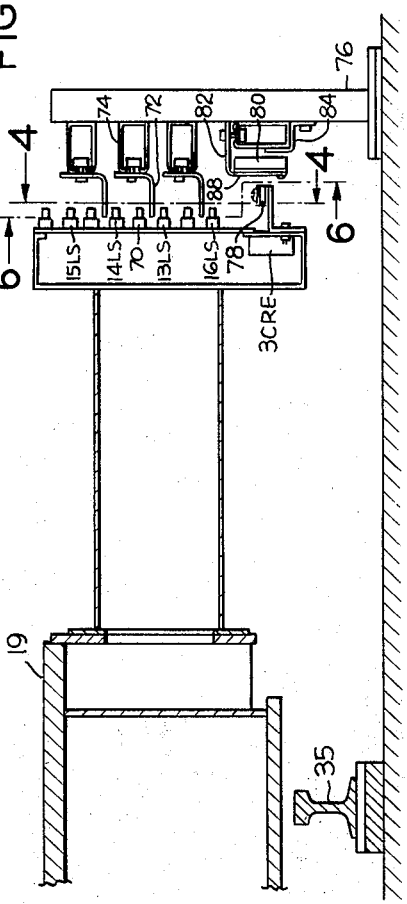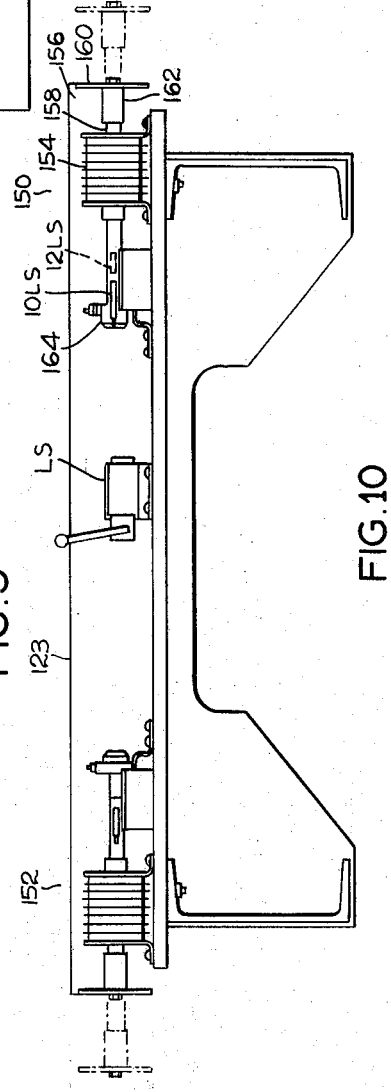

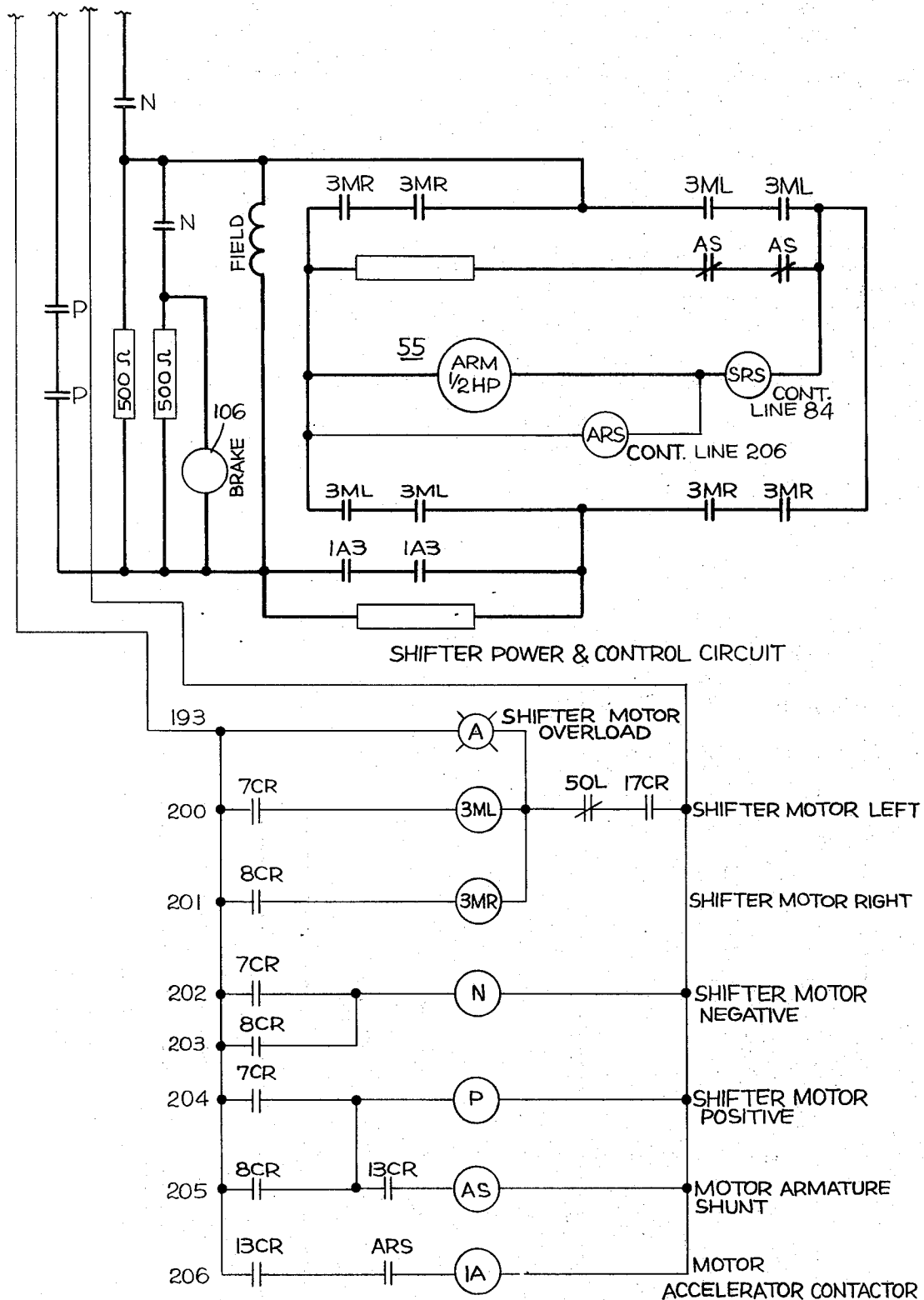
FIG. IIA

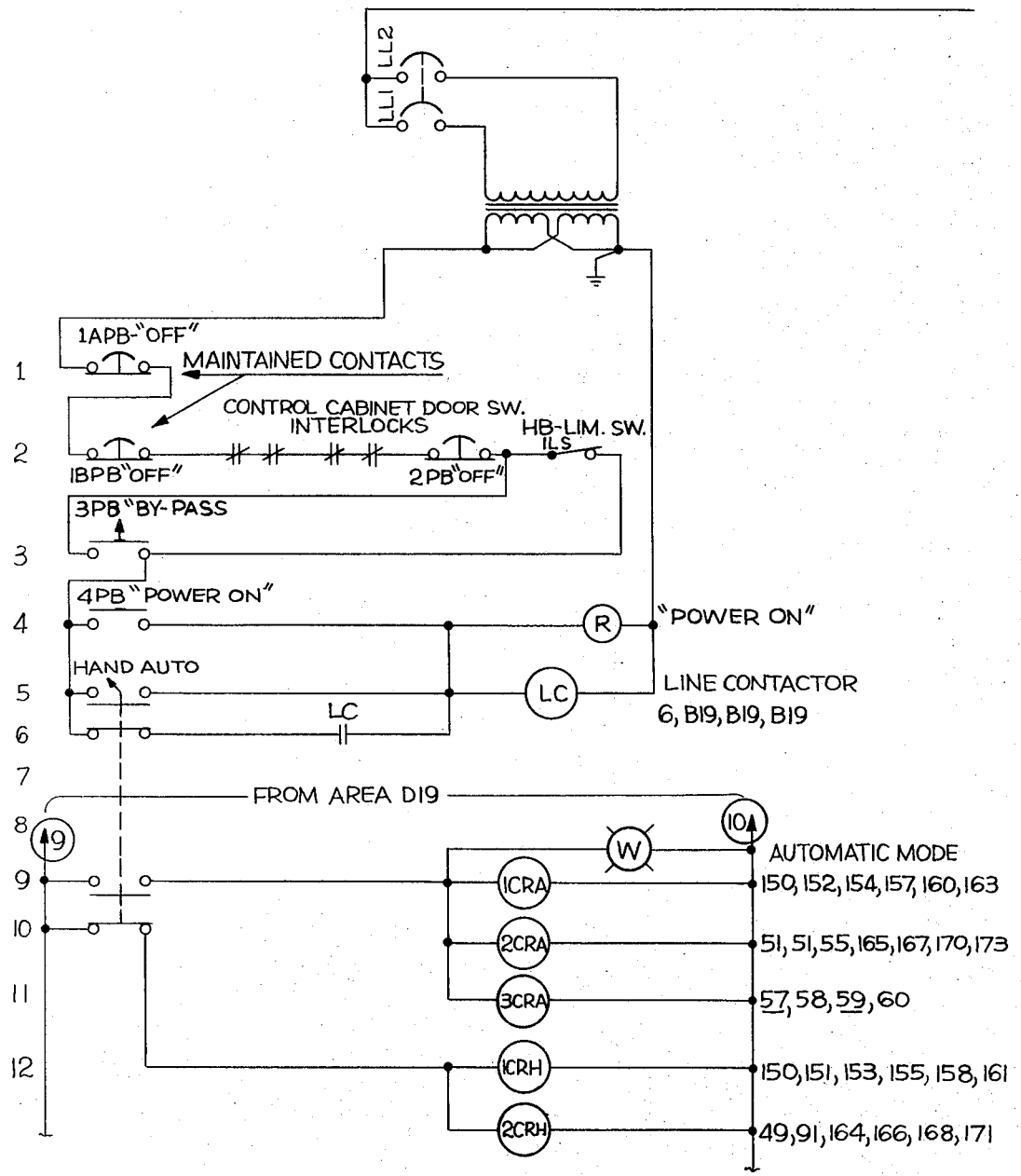
FIG. IIB

AUTOMATIC WAREHOUSE CRANE

BACKGROUND OF THE INVENTION

1. Field of the Invention

This invention relates generally to automatic warehouse systems employing stationary load storage facilities and a movable load carrier cooperable therewith. More particularly, it relates to improved control means for the movable load carrier.

2. Description of the Prior Art

Some automatic warehouse systems employ stationary storage facilities comprising storage racks in which a plurality of storage stations are arranged in horizontal rows and vertical columns. Typically, the racks are fabricated of steel beam structural members and two racks which are mirror images of each other are disposed opposite each other across an aisle. A movable load carrier operating from a pick-up and delivery station (or home station) is movable up and down the aisle to a position adjacent any desired vertical column in a rack. A carriage on the load carrier is movable vertically to a position adjacent any desired horizontal row in a rack. A load shifter on the carriage is movable laterally to store or retrieve a load at a particular station in either rack. The carrier, carriage and shifter are driven by individual electric motors which are operated by electric control means comprising switches, relays, limit switches and other electromechanical devices. Typically, the control means can be programmed to operate automatically or can be operated in response to manual pushbutton or lever control. Because of economic and space considerations, clearances between component parts of the storage racks and component parts of the load carrier are quite small. However, this fact was used to advantage in the location and mounting of electromechanical limit switches and other control devices on the racks and on the load carrier.

Heretofore it was the practice to use electromechanical limit switches to ascertain whether a load was properly disposed on the shifter. While this was satisfactory for some purposes, projecting limit switches depend on physical contact for operation and were, therefore, themselves subject to damage by projecting loads.

Furthermore, the control means formerly used to effect positioning of the bridge and carriage with respect tot the storage racks sometimes employed electromechanical limit switches mounted on the carrier or storage racks or both which, as previously noted, were easily damaged by a projecting load or by improper operation of the load carrier. And in those situations where photoelectric type devices were used exclusively for positioning instead of electromechanical devices, the load carrier could easily overrun a desired stopping position.

In some prior art systems which used means to ascertain whether a particular storage station was already occupied, a probe-operated switch was used. However, the probe did not come into play until the shifter had commenced movement and this sometimes resulted in a load at a storage station being improperly displaced or even pushed out of the opposite side of the storage station before the probe had a chance to perform its function.

Finally, most if not all prior art systems were designed so that one storage station could accommodate only one load thereat at any particular time and, therefore, the shifter was movable to only one position with respect to a particular station and extended only for its own length.

It is desirable, therefore, to provide improved automatic warehouse systems, and particularly load carriers and control means therefor, which overcome the aforementioned drawbacks and have other advantages, as will hereinafter appear.

SUMMARY OF THE INVENTION

The present invention contemplates an automatic warehouse system comprising stationary storage means or facilities including a plurality of storage stations, and a movable load carrier for cooperation therewith to move a load between a pick-up and delivery (or home) station.

The storage facilities comprise a pair of storage racks, each a mirror image of the other, which are disposed opposite each other across an aisle. Each storage rack comprises a plurality of storage stations which are arranged in horizontal rows and vertical columns. Each storage station comprises a platform or a pair of spaced apart horizontal supports which extend or project toward the aisle. Each platform or pair of supports defines at least one, but preferably three, storage stations.

The load carrier comprises a base or bridge, having at least one but preferably a pair of spaced-apart vertical or upright masts and is horizontally movable up and down the aisle. A vertically movable carriage is mounted on the bridge and is movable parallel to the mast and between them if there are two masts. One or more independently or simultaneously movable shifters are mounted on the carriage and each is laterally movable in opposite directions from a center position on the carriage to any one of three positions in any one of the stations in the racks. In the embodiment shown, the shifter comprises a single extendable member movable to three positions. However, a shifter employing a plurality of telescoping extendable members could be employed to extend the reach of the shifter beyond its telescoped length. The bridge, carriage and each shifter are each movable by an individual electric motor.

Control means are provided to operate the motors to move the load carrier and its component parts and to perform other control functions and such control means are operable in the manual, semi-automatic or automatic mode.

In accordance with the invention, the control means comprises means for sensing whether a load is properly disposed on the shifter and for stopping or preventing operation of the bridge and carriage motors if it is not. Such means comprises one each side of the carriage at least one radiation source such as light source, for providing a radiation beam, at least one receiver, such as a photoelectric cell on which said beam normally impinges, and means responsive to interruption of the beam to prevent horizontal movement of the bridge and to prevent vertical movement of the carriage. The light source and photoelectric cell receiver are mounted on the same side of the carriage and are disposed so that the receiver is located above the light source. This reduces the possibility of ambient light affecting receiver operation. The light beam is disposed in a direction transverse to the paths of movement of both the bridge and the carriage so that it is angularly disposed and therefore more likely to detect improperly positioned loads. The light beam is spaced a predetermined distance from the side edge of the shifter when the shifter is centered, so as to sense a load which projects beyond the edge more than clearance distance allows. In a preferred embodiment of the invention, two light beams are provided on each of the opposite sides of the carriage. Thus, on one side there are provided a pair of radiation sources for providing a pair of radiation beams to a pair of receivers arranged on the same side of the carriage and the pair of beams intersect. Two intersecting beams substantially increase the probability of detecting a skewed load, particularly if the load is of irregular shape. Interruption of either light beam by a skewed load causes the photoelectric cell to effect operation of relays which effect deenergization of control circuits for operating the bridge motor and carriage motor (but not the shifter motor) and also cause a skewed load indicator device, such as a warning light, to go on.

In accordance with another aspect of the invention, the control means comprises means for accurately positioning the bridge adjacent a particular vertical column of storage stations whether the bridge is being moved in the manual, semiautomatic or automatic mode. The bridge positioning means comprises magnetically responsive switch means which provide a light signal to the operator when the crane is operated in the manual mode and which effect slowdown of the bridge motor as the bridge approaches a particular column when the crane is operated in the semi-automatic or automatic modes. The bridge positioning means further comprise photoelectrically responsive switch means which provide a light signal to the operator to show that the bridge has reached exact position with respect to a particular column when the crane is operated in the manual mode and effect stopping of the bridge when the crane is operated in the semi-automatic or automatic modes. The magnetically responsive switch means comprises a magnetic means carried on the bridge and one or more magnetically operable switch, such as a reed type switch, actuable by the magnet disposed adjacent the path of movement of the bridge. The photoelectrically responsive switch means comprises a light source and light sensor carried on the bridge and one or more light reflectors disposed adjacent the path of movement of the bridge. One light reflector and one magnetically operable switch are provided for each vertical column and both are located at the same position adjacent the path of movement of the bridge with respect to a particular column.

In accordance with another aspect of the invention, the control means comprises means for accurately positioning the carriage adjacent a particular horizontal row of storage stations. Such means comprises one or more magnetically responsive or actuable switch, such as a reed type switch, and a separate magnet for actuating each of said switches to effect a control function, such as operation of the carriage motor. The switch and its associated magnet are mounted in spaced apart fixed relationship on one portion of the load carrier, such as the carriage. The control means further comprises at least one switch operating member, such as a relatively movable metal plate or vane, for actuating the reed switch when disposed near the magnet i.e., between the magnet and its associated switch. The switch operating member or vane is mounted on another portion of load carrier, such as the bridge mast, at a predetermined location with respect to one horizontal row of stations in the load support means. Typically, at least one such vane is provided for each row. More specifically, the bridge includes a vertical mast and the switch operating member or vane is mounted on the mast at some position opposite a horizontal row and preferably in such a location so that it is interposed between the reed switch and the magnet as the carriage moves with respect ot the mast. In further accordance with the invention, a plurality of pairs of reed switches and magnets are provided on the carriage, one pair being provided for slow-down purposes in the vertical movement of the carriage and the other pair being provided for stopping purposes when proper position of the carriage opposite a horizontal row. A plurality of corresponding switch operating members or vanes are provided on the bridge mast and the vanes of each row are vertically spaced or displaced from each other for each row. When the crane is operated in the manual mode, the slow-down switch arrangement and the stopping switch arrangement both provide appropriate light signals to the crane operator. When the crane is operated in the semi-automatic or automatic mode, the two switch arrangements effect slow-down and stopping of the carriage. As hereinafter explained, the slow-down and stopping positions for each horizontal row are different, depending on whether the carriage is operating to retrieve or store a load.

A reed switch, magnet and metallic vane arrangement, similar to that described is also used to control bridge movement as it approaches either end of the aisle. For such purposes, the reed switch and magnet are carried on the bridge and the vanes are mounted alongside the path of bridge movement.

In accordance with another aspect of the invention, the control means for an embodiment of the invention having a shifter movable to only one position in a storage station comprises means for sensing whether or not a particular storage station or bin is already occupied by a load and unable to receive another load. Such means comprise one full bin detector device located at each side of the one-position shifter. The full bin detector device is operative when the crane operator in the automatic or semi-automatic mode. Each device comprises a linear actuator or motor having a linearly movable probe which, before the shifter moves laterally, is extended toward a station. If the probe is able to extend fully, it trips a limit switch thereby indicating that the station is unoccupied and also effecting its own retraction. If the probe is unable to extend fully, time delay means effect its retraction and also indicate that the station is already occupied by a load.

In accordance with still another aspect of the invention, the control means for an embodiment of the invention having a shifter movable to one or more positions in a storage station comprises means for moving the load shifter to any one of a plurality of positions at each storage station to store or retrieve a load thereat.

An automatic warehouse system having control means in accordance with the invention, as described herein, is more economical to fabricate and maintain and more reliable in use than those of the prior art, principally because numerous projecting electromechanical limit switches are eliminated. Other advantages of control means in accordance with the invention will hereinafter appear.

DRAWINGS

FIG. 2 is a side elevational view showing one of the storage racks and showing the load carrier with its carriage in lowered position;

FIG. 3 is a top plan view of the upper end of the load carrier;

FIG. 4 is an enlarged front elevational view of bridge position control switches on the surface and a control box used on the bridge of the load carrier;

FIG. 5 is a side elevational view of the control box and switches shown in FIG. 4;

FIG. 6 is a front elevational view of switch and switch actuator support means shown in FIG. 5;

FIG. 10 is a view, with portions broken away, of the carriage of the load carrier shown in FIGS. 7, 8 and 9;

Figure 11:
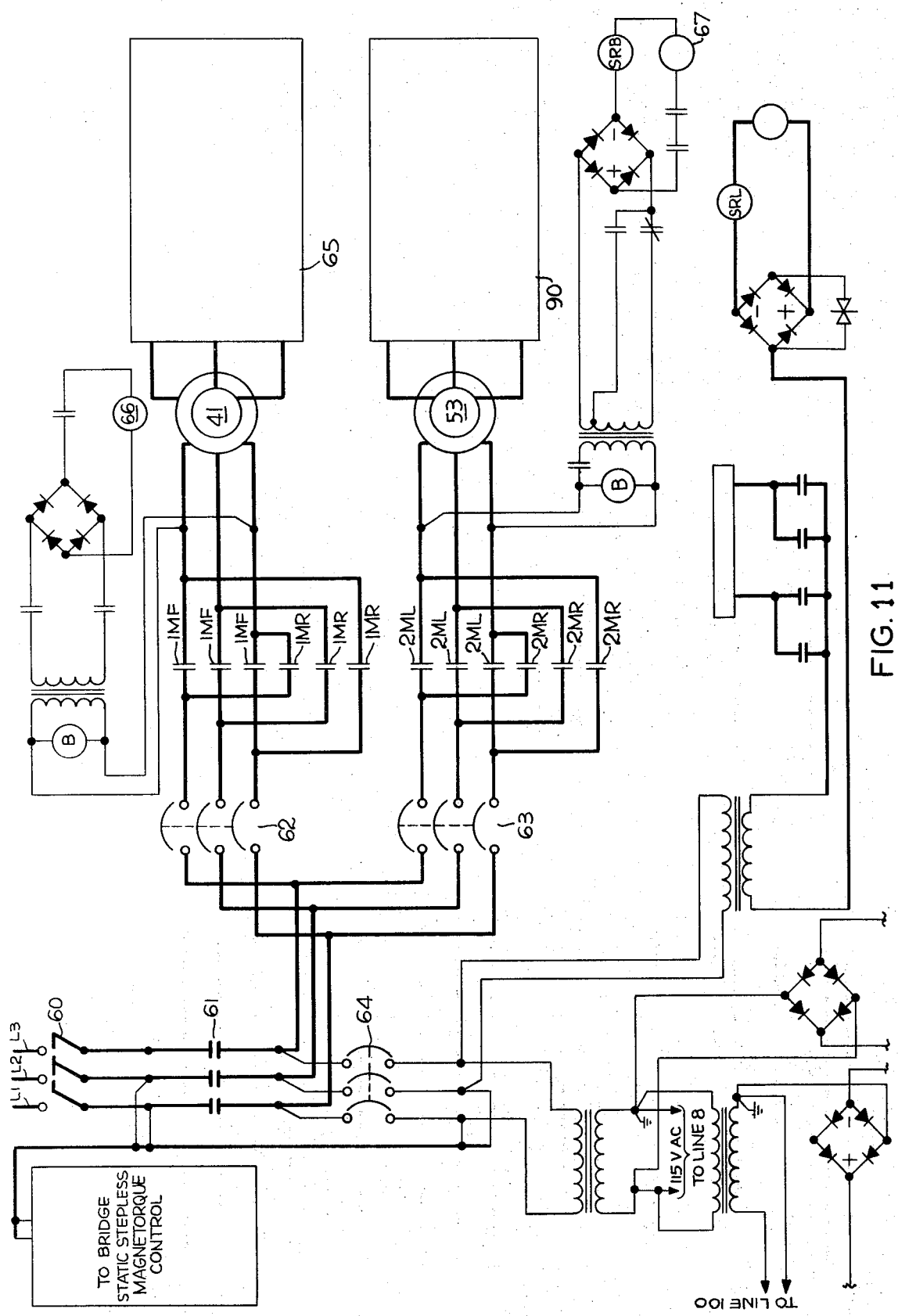
Figure 11C:
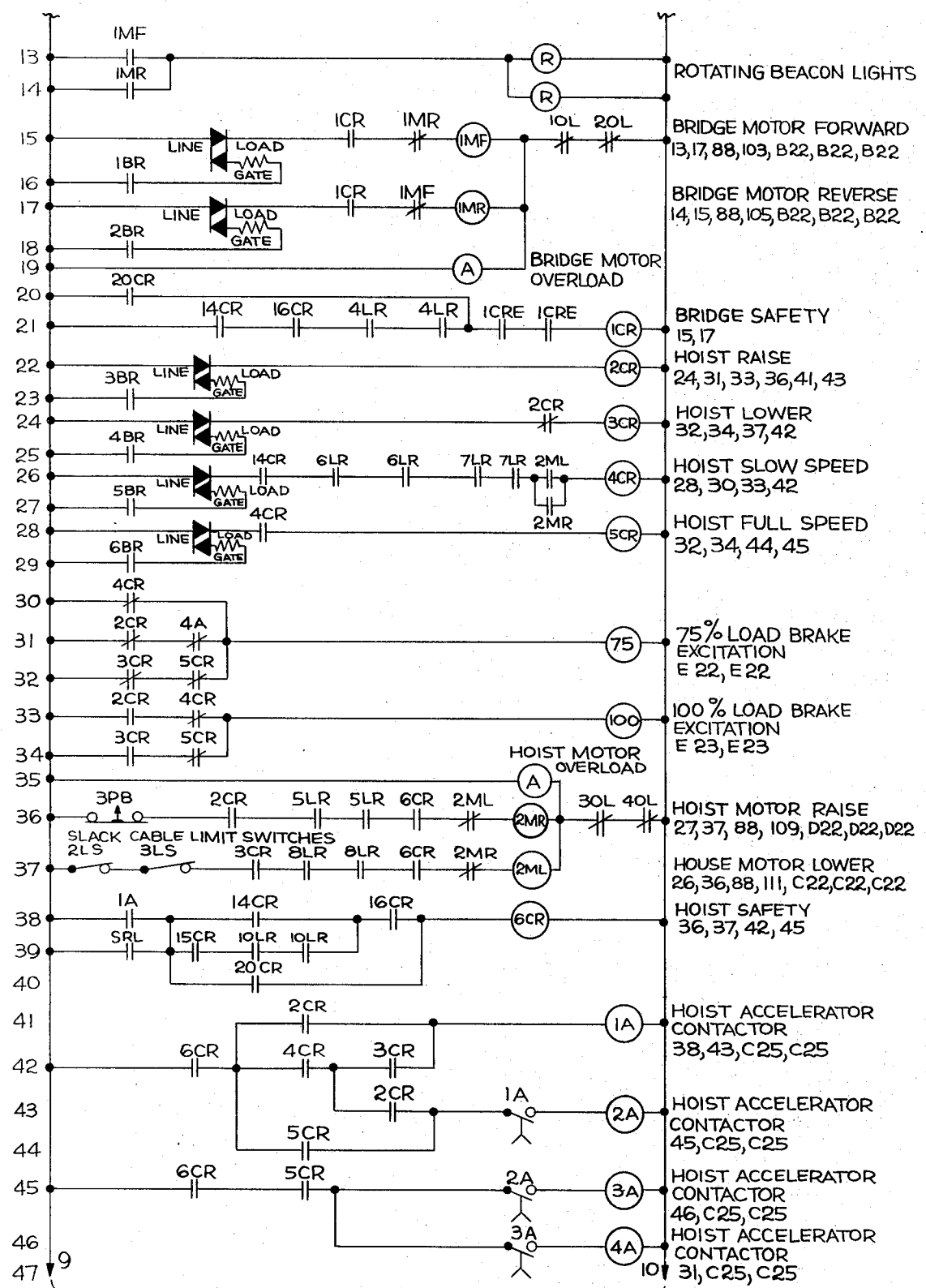
Figure 11D:
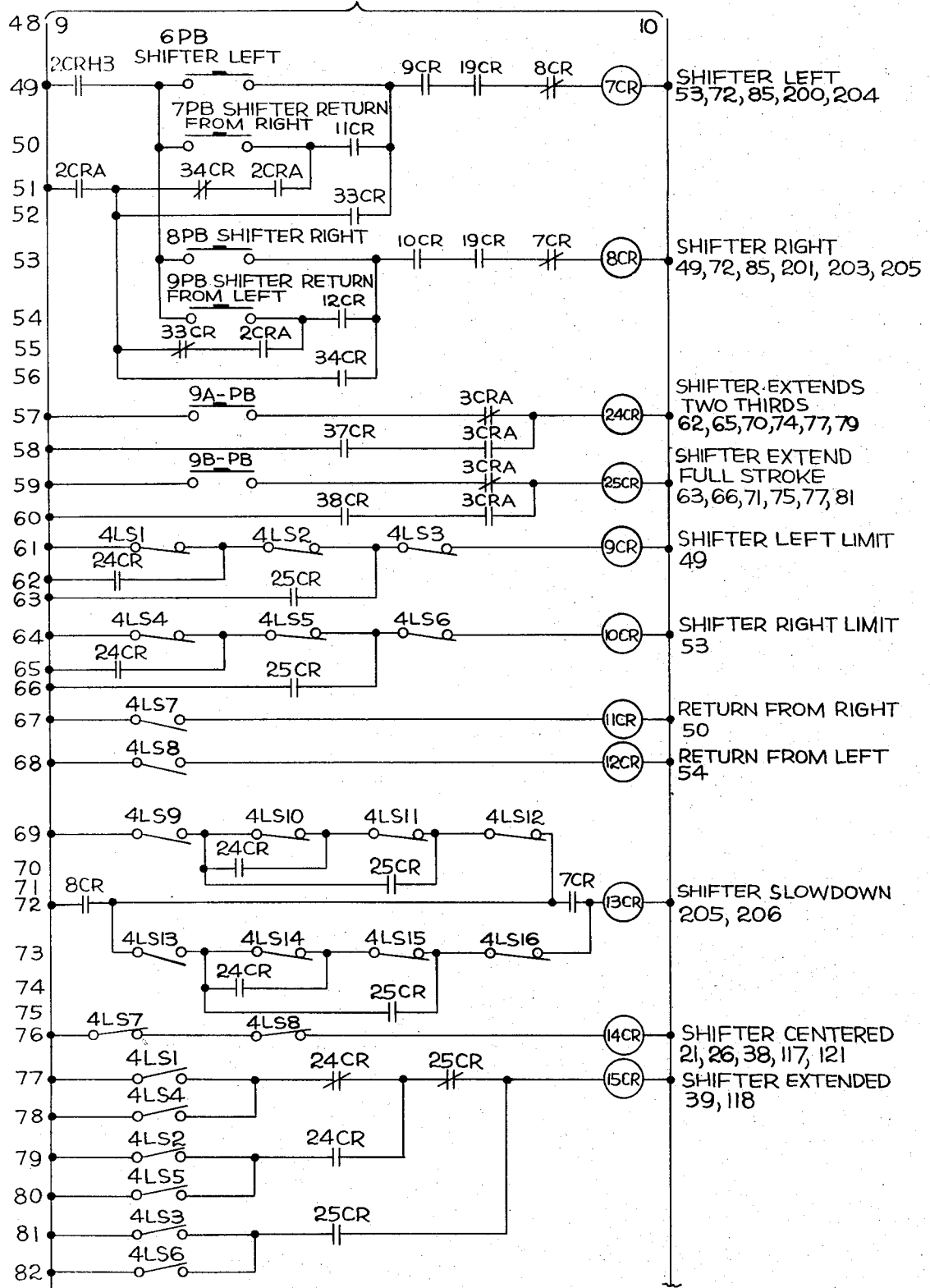
Figure 11E:
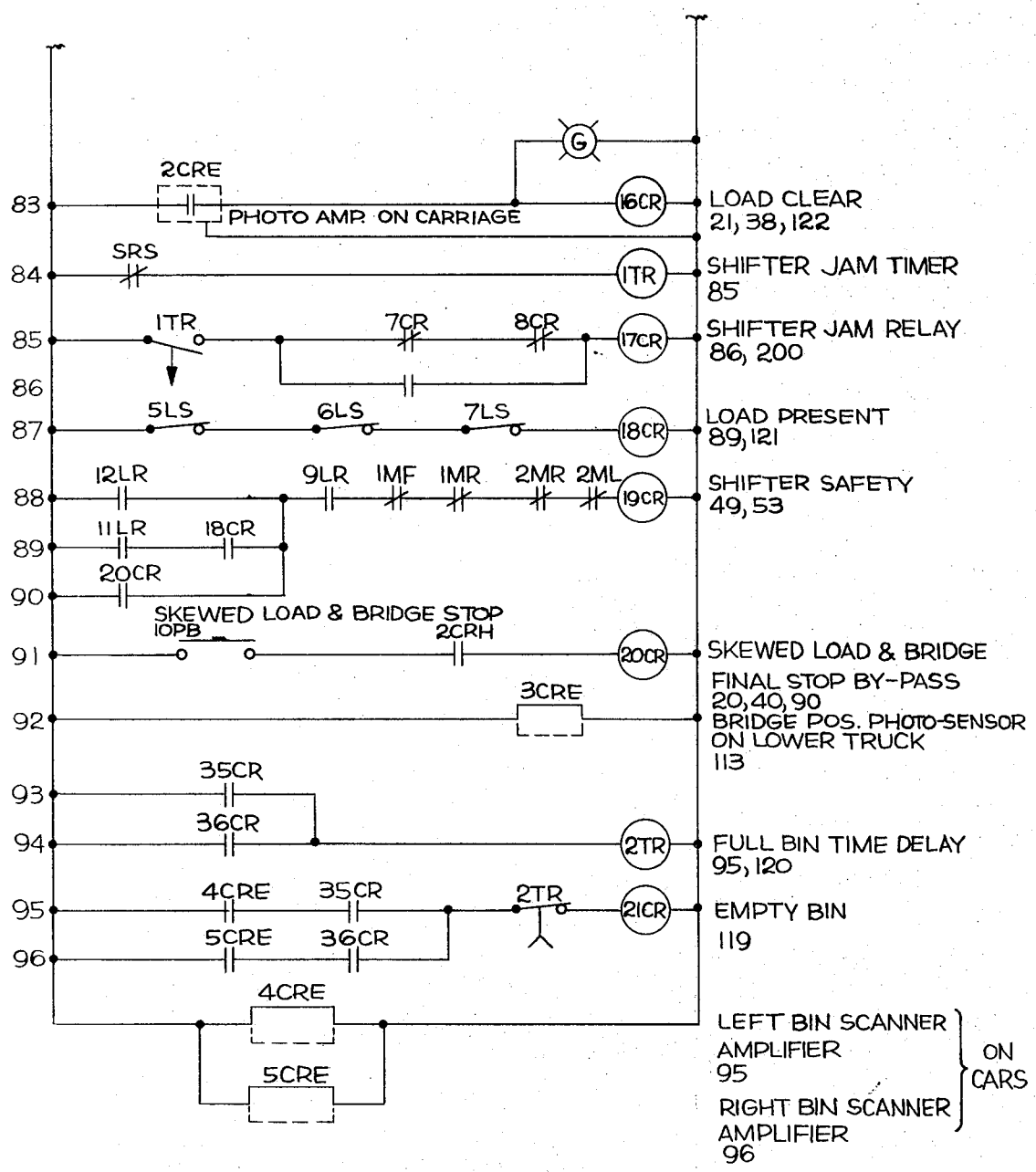
Figure 11F:
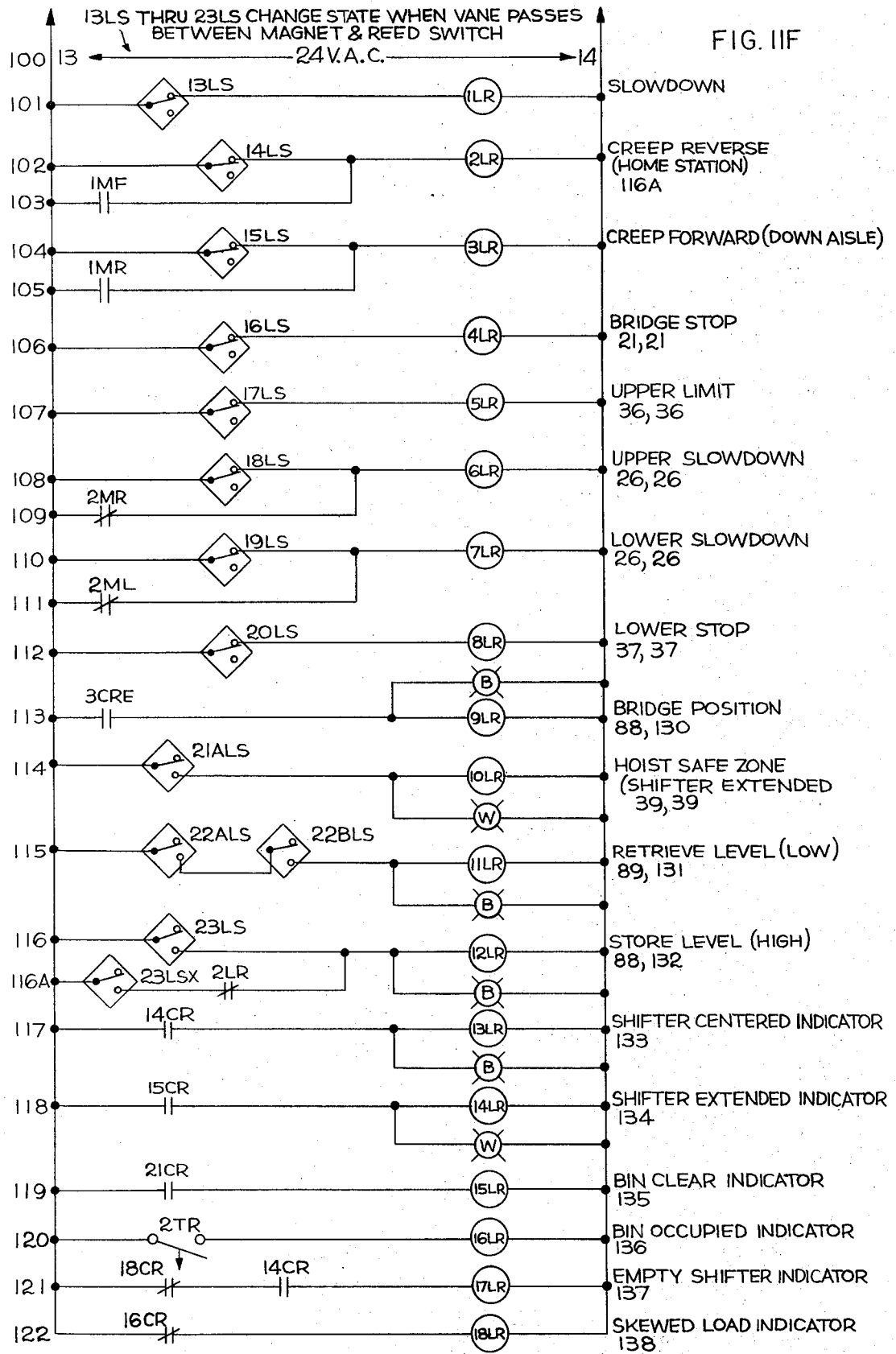
Figure 11G:
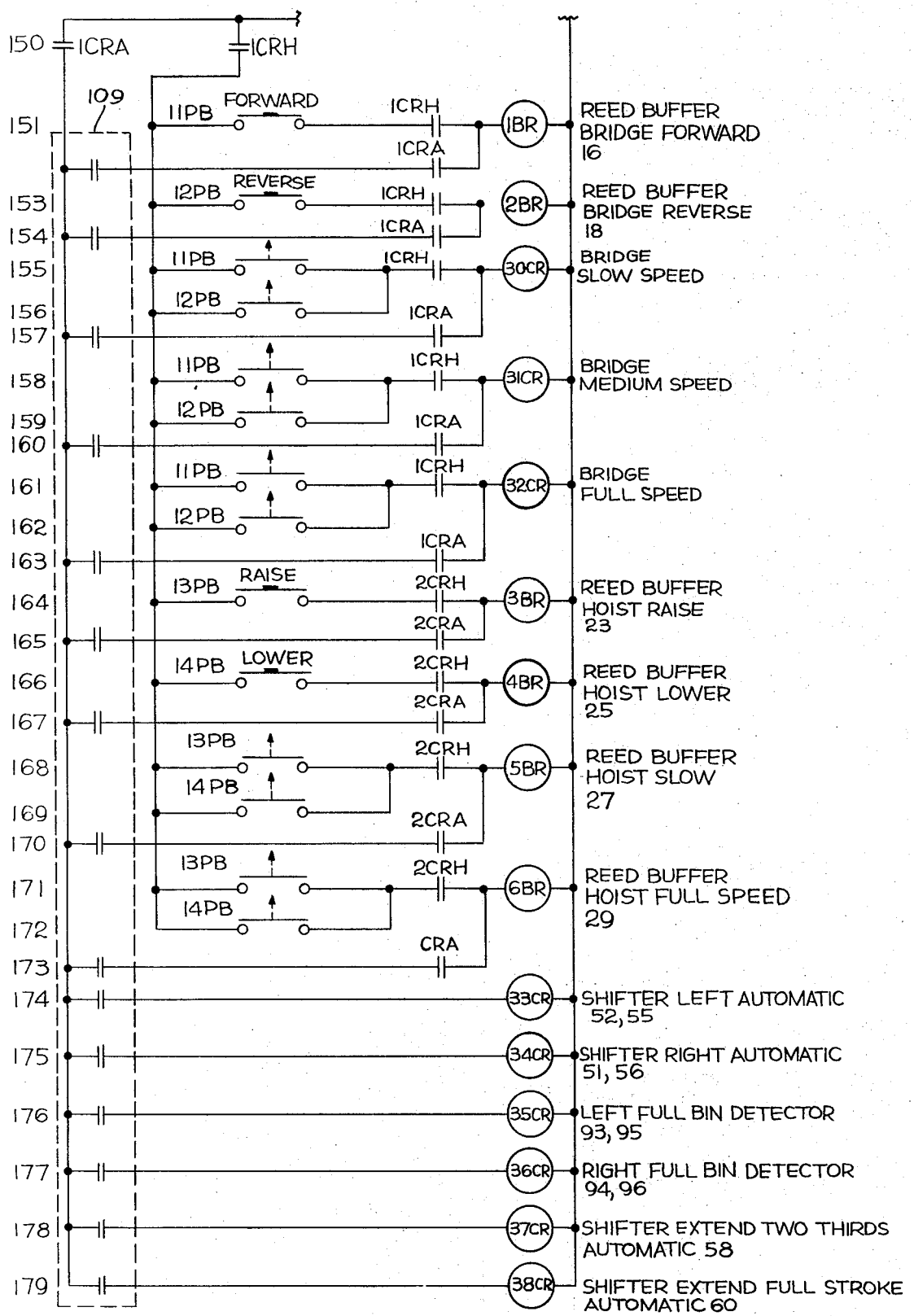
Figure 11H:
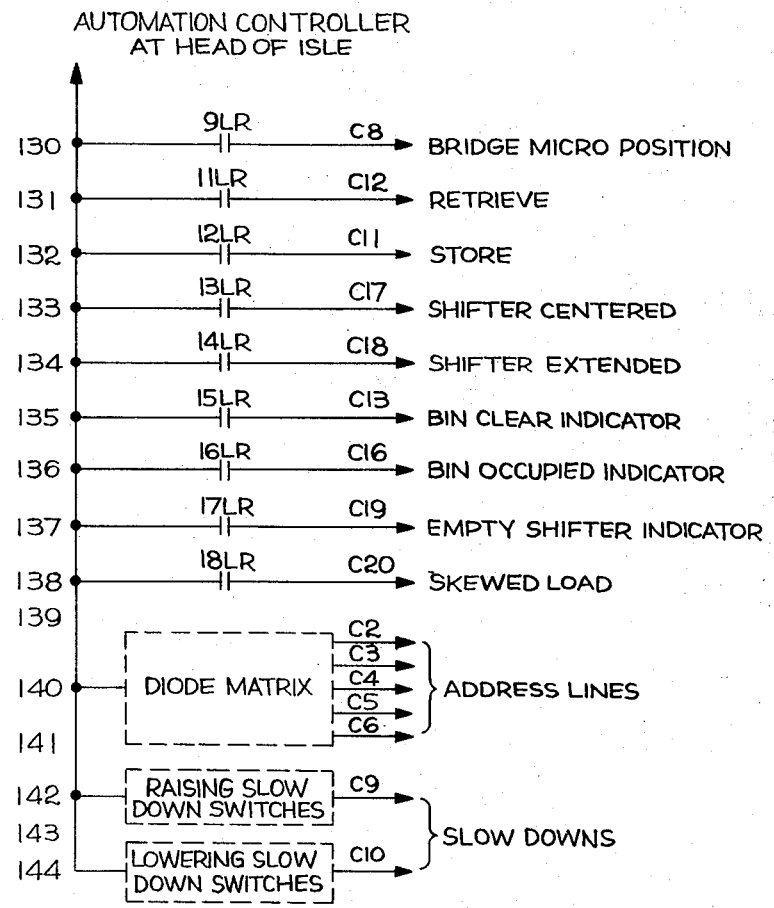
Figure 12:
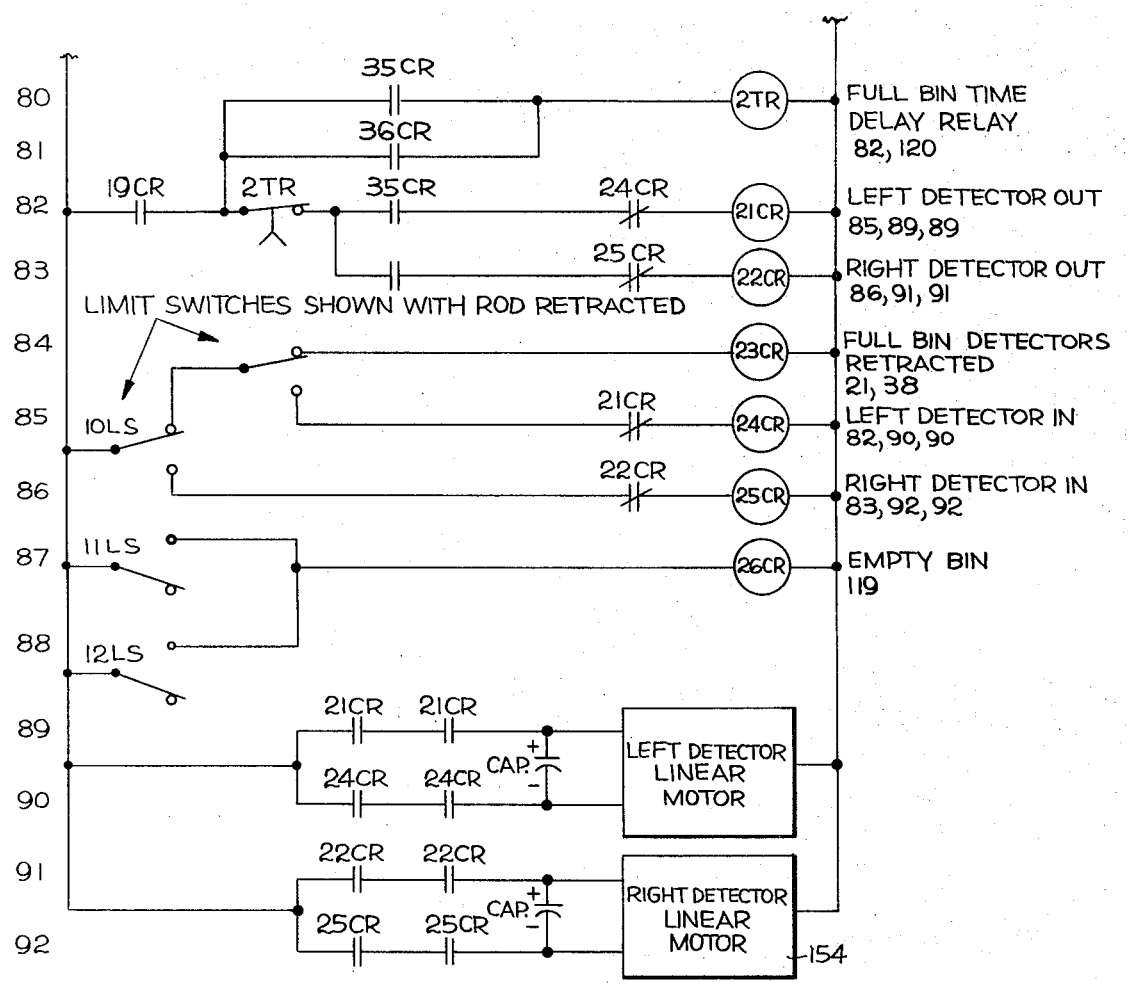

FIG. 11 and FIGS. 11A through 11H (on sheets 6 through 14 of the drawings) depict a circuit diagram of the control means for the embodiment shown in FIGS. 1 through 6, with sheet 6 containing FIG. 11 principally showing the circuits of the hoist and bridge motors and the contactors therefor;

with sheet 7 containing FIG. 11A principally showing the circuit of the shifter motor and the contactor therefor;

with sheet 8 containing FIG. 11B principally showing the manually controlled pushbutton portion of the circuit;

with sheet 9 containing FIG. 11C showing circuit location lines 13 through 47;

with sheet 10 containing FIG. 11D showing circuit location lines 48 through 82;

with sheet 11 containing FIG. 11E showing circuit location lines 83 through 96;

with sheet 12 containing FIG. 11F showing circuit location lines 100 through 122;

with sheet 13 containing FIG. 11G showing circuit location lines 150 through 179;

with sheet 14 containing FIG. 11H showing circuit location lines 130 through 144; and FIG. 12 is a circuit diagram of a portion of the control means for the embodiment shown in FIGS. 7, 8, 9 and 10.

DESCRIPTION OF THE PREFERRED EMBODIMENTS

First Embodiment

Figure 1:
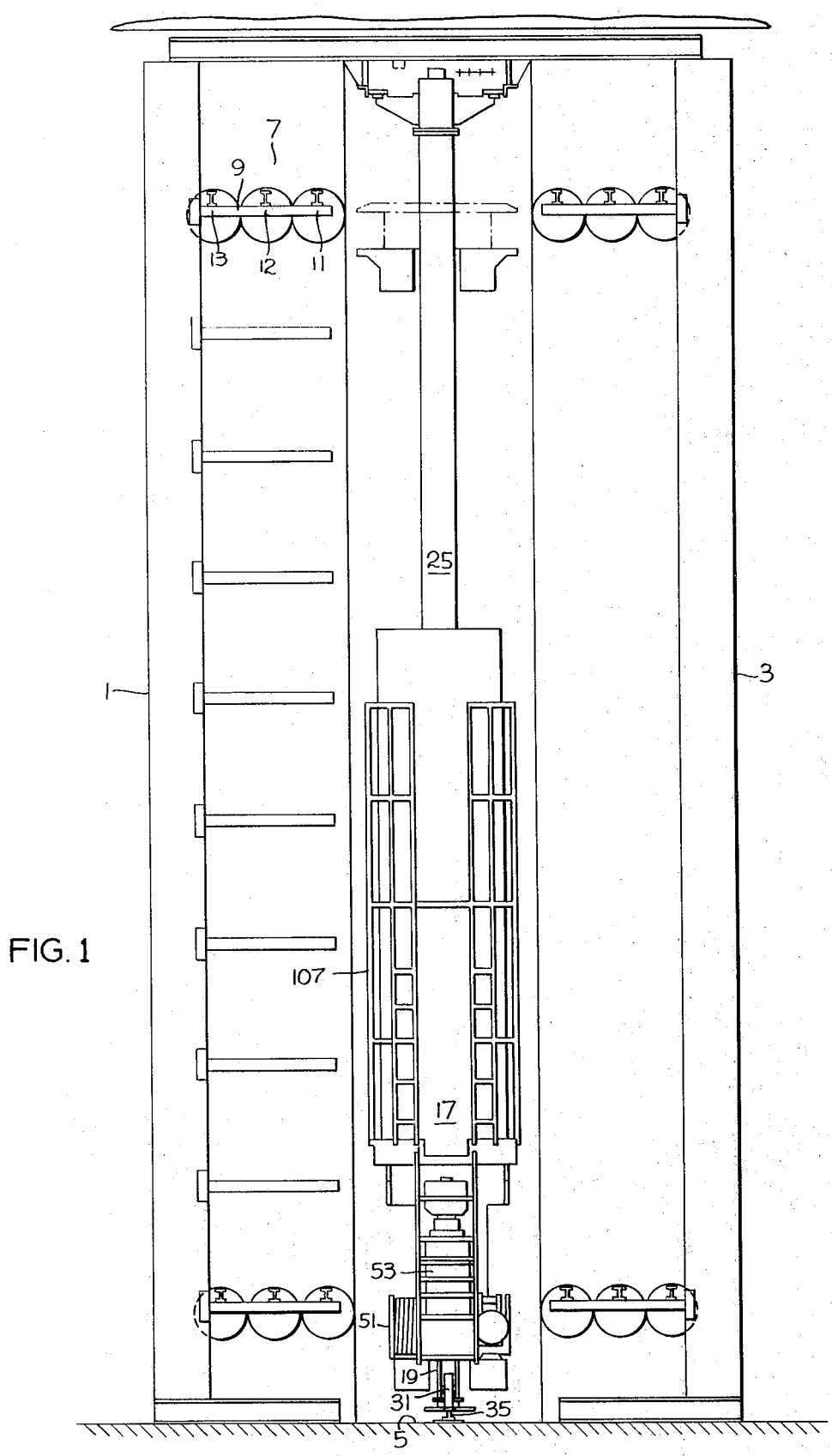
FIG. 1 is an end elevational view of an automatic warehouse system in accordance with the invention comprising a movable load carrier shown between a pair of spaced apart storage racks and with its carriage in raised position.

Referring to FIGS. 1 and 2 of the drawings, there is shown an automatic warehouse system in accordance with the invention. The system comprises stationary load storage facilities or means in the form of two spaced apart load storage racks 1 and 3 which are mirror images of each other and face each other across a narrow aisle 5. Storage rack 1 comprises a plurality of load storage stations, such as station 7, which are arranged in horizontal rows and vertical columns. As FIG. 2 shows, station 7, for example, is located in the first column, tenth row up of rack 1. In accordance with one embodiment of the invention, each station comprises a pair of spaced-apart parallel horizontal supports, such as the supports 9 at station 7, which extend toward aisle 5. Furthermore, each station or pair of supports can accommodate one load at any one of three storage positions thereat. Referring to station 7, the storage positions are designated position 11 (closest to aisle 5), position 12 (center position), and position 13 (most remote from aisle 5). For purposes of discussion, the loads to be stored and retrieved take the form of automobile assemblies, such as axle assembly 15 shown in FIG. 2.

The automatic warehouse system further comprises a movable load carrier or stacker crane 17 which is normally located at a pick-up and delivery or home station beyond one end of aisle 5 and is movable into the aisle for access to any storage position in any storage station in the racks 1 and 3.

Crane 17 comprises three basic components designated as a bridge 19 which moves horizontally in forward and reverse directions in aisle 5; a carriage 21 which is mounted on the bridge and moves vertically in opposite directions; and a shifter 23 (shown in FIG. 2) which is mounted on the carriage and moves laterally or horizontally from a centered position on the carriage in either direction (i.e., left or right with respect to FIG. 1) toward and into any station in the racks 1 and 3, respectively. Shifter 23 in the first embodiment of the crane 17 is laterally movable to each of the three positions in a storage station and is therefore extendable to first, second and third extended positions in either the right or left direction with respect to FIG. 1.

Bridge 19 comprises a pair of spaced apart upright masts 25 and 27 which are joined at their tops by a cross member 29. Bridge 19 is provided with a pair of wheels 31 and 33 (one at each end) which adapt it to be supported on and move on a straight rail or track 35 which extends from the home station down aisle 5. The cross member 29 at the upper ends of the masts 25 and 27 is provided with a plurality of wheels 37, shown in FIG. 3, which bear against the inner surfaces of a pair of spaced apart overhead guide rails 39 which extend parallel to track 35. The guide rails 39 serve to stabilize bridge 19 and prevent it from tipping. Bridge 19 is moved in forward and reverse directions by an electric bridge motor 41 which is mounted thereon and connected to drive wheel 33. An operator's cab 107 is provided on the side of crane 17.

Carriage 21, which is supported and guided for vertical movement between the masts 25 and 27, comprises a front wall 43 and a rear wall 45 but is open at its right and left sides, as FIG. 2 shows. Carriage 21 is suspended from and moved by a pair of cables 47, shown IN FIG. 2, which are attached thereto, reeved over pulleys 49 on cross member 29 on the upper ends of the masts 25 and 27, and are wrapped on a drum 51 on a bridge 19. Carriage 21 is raised and lowered by means of an electric carriage or hoist motor 53 which is connected to drive drum 51.

Shifter 23 is mounted on carriage 21 and is laterally movable from a centered position to either right or left (with respect to FIG. 1) to any of three extended positions in the direction chosen. Shifter 23 is extended and retracted by means of an electric shifter motor 55, shown in FIG. 2, which operates in the forward (extend) and reverse (retract) direction. A detailed description of a type of shifter suitable for adaptation and use in the present invention is provided in U.S. Pat. No. 3,586,194 for "Antifriction Bearing Means, etc.," issued to Max J. Dechantsreiter on June 22, 1971, and assigned to the same assignee as the present application.

Control means (shown in diagrammatic form in FIGS. 11 through 11H), are provided by means of which crane 17 can be operates either automatically in response to instructions from a computer program, semi-automatically or manually in response to pushbutton commands given by a human operator. In the subsequent description of operation, manual or automatic operations are described where noted, however, it is to be understood that semi-automatic operation is similar to automatic.

In the manual mode, the crane operator observes the bridge and carriage position as the crane traverses down the aisle and uses light signal means hereinafter described for the fine or accurate positioning. In the automatic and semi-automatic mode, the actual addresses of storage stations whether they be bridge or carriage positions, are inserted in the form of a computer program or preset switching into an automatic controller. When the magnet actuates the switches relating to either mast or bridge position as the crane moves, these switch operations are interpreted by the automation controller at the head of the aisle to automatically slow down and stop the bridge and carriage.

In addition to command pushbutton switches, hereinafter described, while initiate various crane operations, the control means comprise various limit switches and safety devices, also hereinafter described, which insure safe operation and correct crane positioning and, in some cases, effect automatic completion of functions initiated by pushbutton command. Unless specifically stated, the command pushbuttons are assumed to be located at an operator's station remote from crane 17 or in a cab located on the crane, whereas the limit switches and safety devices are assumed to be located at appropriate places on or adjacent the crane inself. The automation controller (not shown) is located at an operator's control station remote from the crane. The control means for crane 17 also comprise control circuitry which is disclosed and described in connection with FIGS. 11 through 11H. The control means for crane 117 is similar to that for crane 17 except as modified in FIG. 12. As FIG. 3 shows, electric power for operating the motors 41, 53 and 55 and for energizing the electric control circuit for crane 17 is supplied to a trolley 57 on bridge 19 from trolley wires L1, L2, L3 which are located between the overhead guide rails 29 and extend parallel thereto.

Figure 8:
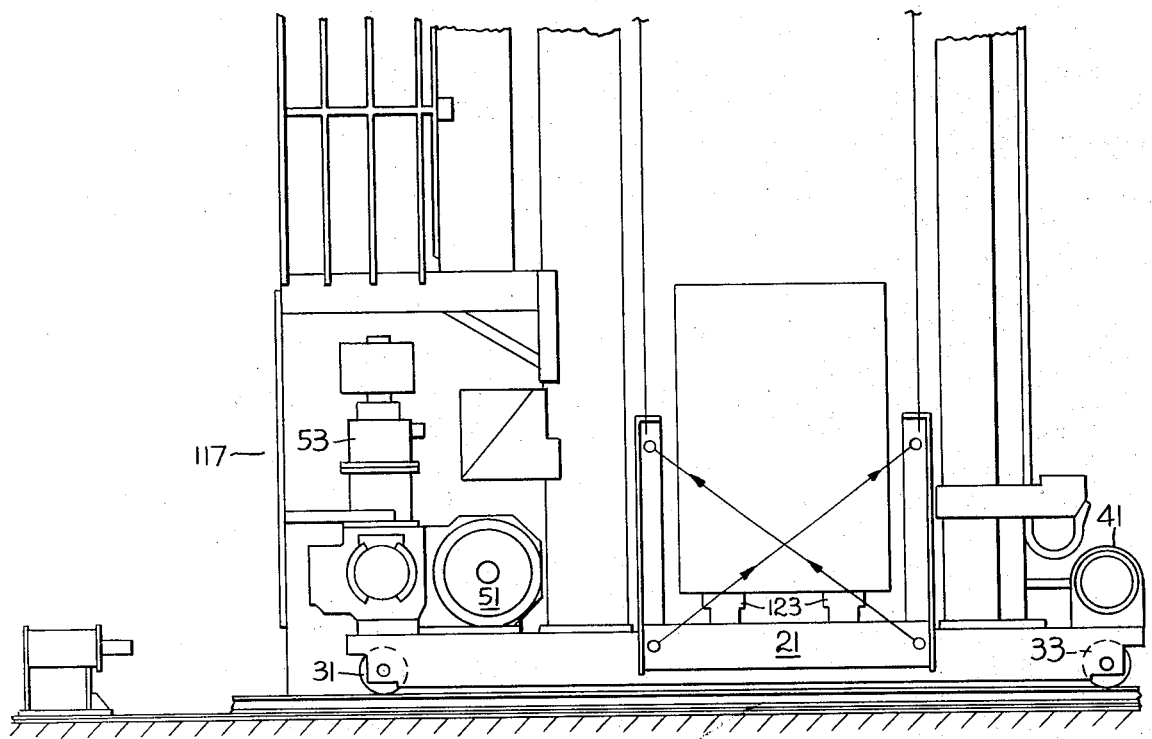
FIG. 8 is a side elevational view of the load carrier of FIG. 7.
Figure 7:
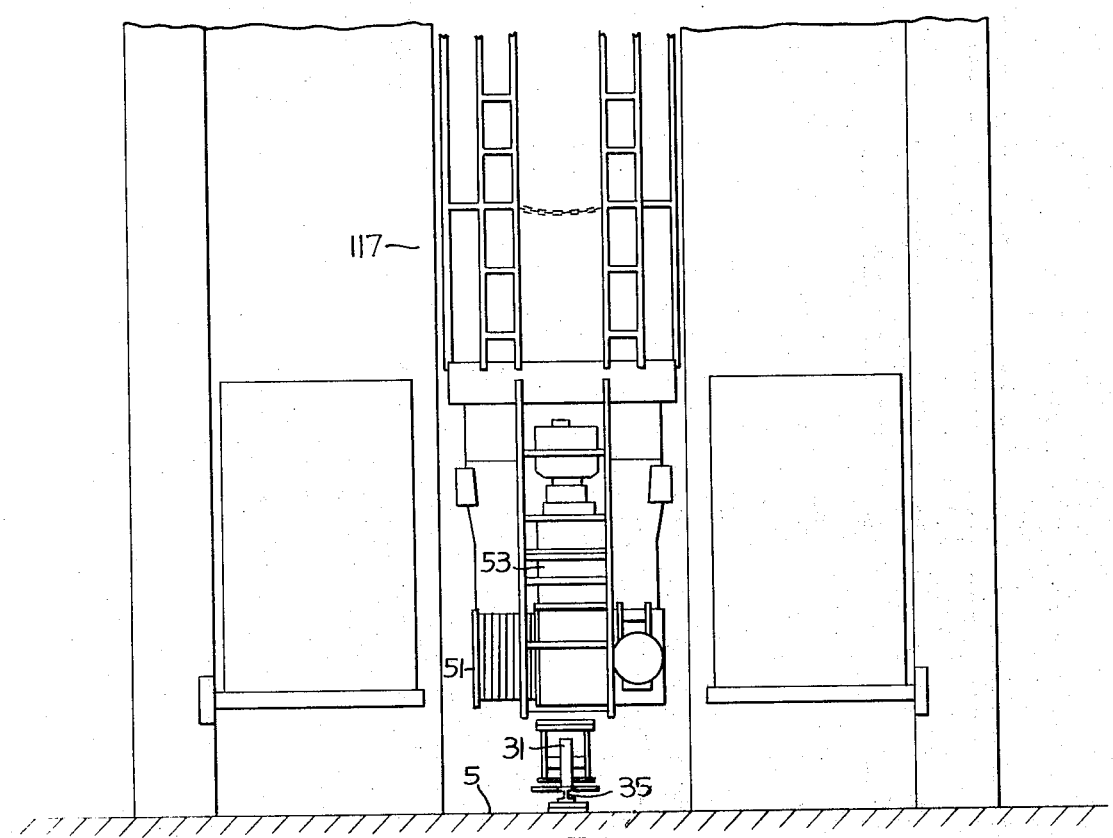
FIG. 7 is an end elevational view of a portion of another embodiment of a load carrier in accordance with the invention.
Figure 9:
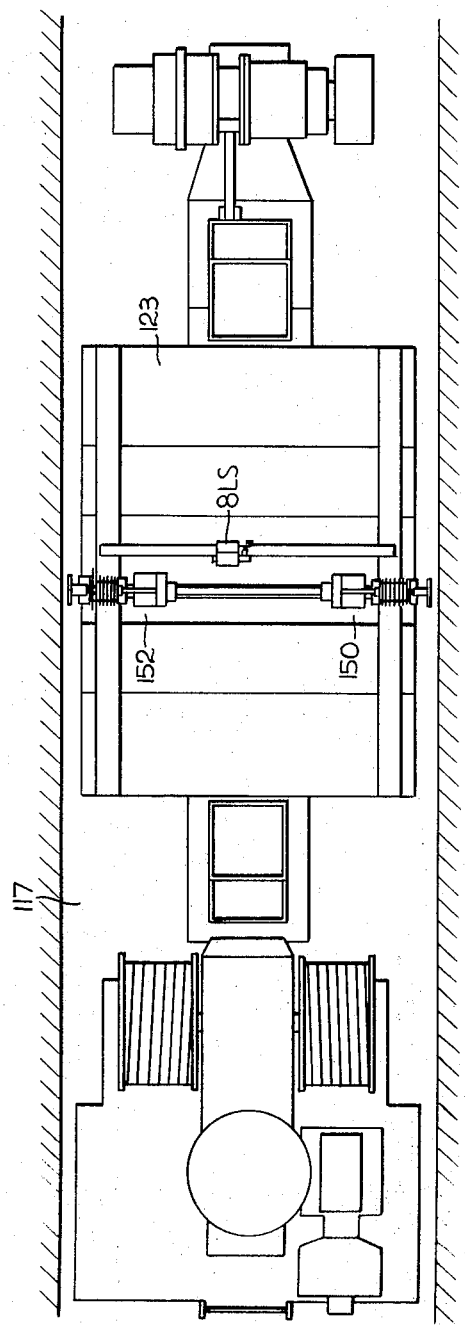
FIG. 9 is a top plan view of the load carrier shown in FIGS. 7 and 8.

FIGS. 11 through 11H on sheets 6 through 14 of the drawings is an elementary control circuit diagram for crane 17 shown in FIGS. 1, 2, 3, 4, 5 and 6. FIG. 12 is a portion of an elementary control circuit diagram for another crane 117, a portion of which is shown in FIGS. 7 and 8, which is similar to crane 17. Crane 117, unlike crane 17, employs a shifter 123 which is movable to only one instead of three positions. Furthermore, the control means for crane 117 comprises ameans in accordance with the invention for sensing whether a particular storage station is already occupied by a load. It is to be understood, however, that the features of crane 117 could be embodied in crane 17 of appropriate modifications were made.

As regards FIGS. 11 through 11H on sheets 6 through 14 of the drawings, the same conductors have the same designation numeral on each page. Location lines in the control circuit are designated by numerals arranged vertically in consecutive order along the left hand side of the sheets 7 through 14. Functions of components at those locations are stated in legends arranged vertically along the right hand side of the sheets 7 through 14. The numerals below each legend designate the location line at which related components are located. The system of designation in FIGS. 11 through 11H is self-explanatory as regards specific control operations and, therefore, protracted verbal explanation of the sequences of operation of relays and contacts are avoided whenever possible in the following description to facilitate understanding of the invention.

The control circuit in FIGS. 11 through 11H and the portion shown in FIG. 12 are shown as de-energized. However, when the control circuit is placed in readiness for operation, certain relays change their state or condition even though no movement of crane components is affected.

The control means for crane 17 are described as follows.

Means are provided for connecting bridge motor 41, hoist motor 53 and shifter motor 55 and all associated circuitry to supply lines L1, L2 and L3 for operation. Such means are shown in FIG. 11 as comprising a main line safety switch 60, a line contactor 61, a bridge motor power contactor circuit breaker 62, a hoist motor power contactor circuit breaker 63, and a shifter motor power contactor circuit breaker 64.

Bridge Movement

Means are provided for controlling bridge motor 41 to move bridge 19 in forward and reverse direction (right and left with respect to FIG. 2) at either slow, medium or full speed.

As FIG. 11 shows, such means comprise bridge motor forward contacts 1MF, bridge motor reverse contacts IMR, and a static stepless magnetorque speed control means 65. Contacts 1MF and 1MR are controlled by contactor coils 1MF and 1MR, respectively, shown on sheet 9 of FIG. 11 and these in turn are controlled by the relay coils 1BR and 2BR and the "forward" and "reverse" pushbuttons shown on 13 of FIG. 11. Speed control means 65 is controlled by relay coils 30CR, 31CR and 32CR and their associated pushbuttons shown in FIG. 11E.

Means are provided to cause automatic braking of bridge motor 41 whenever it is de-energized and includes brake coil 66 of FIG. 11 and its associated circuitry. When brake coil 66 is de-energized it allows a spring-biased mechanical brake (not shown) to set. The brake means also comprise dynamic braking means, including a static stepless magnetorque control, which operates to effect rapid motor deceleration prior to setting of the mechanical brake by operating a static stepless magnetorque control.

Means are provided to cause bridge motor 41 (and bridge 19) to automatically slow down and then stop as the bridge approaches either its home station or the remote end of aisle 5. As FIGS. 4, 5, 6 and 11 show, such means comprise four limit switches 13LS, 14LS, 15LS and 16LS which control relay coils 1LR, 2LR, 3LR and 4LR, respectively. These four limit switches, each of which takes the form of a magnetically operable single pole, single throw vacuum sealed reed type switch device, are mounted on the outermost surface of a control box 69 (shown in FIGS. 4, 5 and 6) which is mounted, as FIGS. 5 and 6 show, on the side of bridge 19 of crane 17 between the crane and storage rack 1. Each of the four switches is associated with a magnet device spaced therefrom, such as magnet device 70 for switch device 13LS which maintains its associated switch device in normally closed condition. Interposition of an actuating device, such as a magnetizable metal member or vane, such as vane 72 for switch device 13LS shown in FIGS. 5 and 6, effects opening of the switch device and subsequent control functions. Vane 72, for example, takes the form of a steel angle iron of L-shaped cross-sectional configuration and is mounted at an appropriate position on support rail or box girder 74 which, in turn, is supported by sapced apart posts 76. The girders 74 are disposed parallel to track 35, as FIG. 5 shows. As bridge 19 moves along aisle 5, it reaches positions therealong (at or near the extreme end of the aisle) where vanes such as 72 are located so as to cooperate with the limit switches 13LS, 14LS, 15LS and 16LS to effect appropriate control functions for movement of the bridge, as FIG. 11F shows.

Means are provided to accurately position bridge 19 adjacent any one of the vertical columns of storage station in racks 1 and 3. Such means comprise automatic bridge slow-down means and automatic bridge stop means which function only when the crane is being operated in the automatic or semi-automatic modes. When the crane is operated in the manual mode, the automatic bridge slow-down means are inoperative and the stop means only provide a light signal to the crane operator to indicate correct bridge positioning at a desired station. The automatic bridge slow-down means comprise a magnet device 78 mounted on the outermost surface of control box 69, as shown in FIGS. 4 and 5, which cooperates with a plurality (one for each column) of magnetically operable single pole, single throw vacuum sealed reed type switch devices, such as switch device 80 shown in FIG. 5 to effect automatic slowdown of bridge motor 41 (and bridge 19) as the bridge approached proper position with respect to a desired column. Switch device 80 is mounted on the rear side of a bracket 82 which, in turn, is mounted on a support rail 84 on the support posts 76 and the switch device is understood to open when magnet 78 comes within a predetermined distance therefrom. Each switch device 80 is normally closed but opens as crane 17 approaches to effect its slowdown. The automatic bridge stops means to accurately position bridge 19 further comprise a bridge position photo-sensor unit 3CRE, shown in FIGS. 4 and 5 and at line 92 in FIG. 11E, which is mounted on control box 69 and which, when actuated by a light beam from light source 86 thereof reflected from a reflector device 88 on the face of bracket 82 (shown in FIGS. 5 and 6), causes contacts 3 CRE (line 113 of FIG. 11F) to close and energize relay coil 9LR. Energization of coil 9LR accomplishes illumination of light B (line 113 of FIG. 11F) and closure of contact 9LR at line 130 of FIG. 11F. Light B is understood to be physically located on the crane operator's control panel and indicates to him that bridge 19 is properly positioned with respect to a particular column. If operation is in the manual mode, the operator then knows that the crane should be stopped at this point if access to a storage station in that column is desired. If operation is in the automatic or semi-automatic mode, closure of contact 9LR indicates to the automation controller that the bridge has arrived at a valid address at which it can be stopped if that column address has been programmed into the automation controller.

A schematic diagram of the automation controller is shown in FIG. 11H and is seen to comprise condition indicator contacts 9LR and 11LR through 18LR which are closed by their associated relay coils shown in FIG. 11F to indicate to the automation controller what, if any, crane function is occurring. The automation controller also comprises a diode matrix, shown diagrammatically at line 140 in FIG. 11H, to which all of the address switches for controlling bridge and carriage movement are connected. The diode matrix ultimately effects control or operation, in appropriate order, of the undesignated contacts enclosed by the dotted line 109 shown in FIG. 11G. The diode matrix is capable of being programmed as by insertion of punch cards or by operation of program switches by the crane operation to effect automatic movement of the crane to any desired storage station (including the home station) in any desired sequence. The address information (i.e., column and row and sequence) causes the automation controller to effect bridge and carriage slow-down and stoppage only at predetermined locations. The automation controller is not effective, however, when crane 17 is operated in the manual mode. The automation controller can be located at the operator's control station at the head of the aisle or on the cab 107 crane itself or in both locations.

Carriage Movement

Means are provided for controlling carriage motor 53 to raise and lower carriage 21 at either slow or full speed.

As FIG. 11 shows, such means comprise carriage motor raise contacts 2MR carriage motor lower contacts 2ML, and a resistance type speed control means 90. Contacts 2MR and 2ML are controlled by contactor coils 2MR and 2ML, respectively, shown in FIG. 11C and these in turn are controlled by the relay coils 3BR and 4BR and the "raise" and "lower" pushbuttons shown in FIG. 11G. Speed control means 90 is controlled by the relay coils 5BR and 6BR and their associated pushbuttons shown in FIG. 11G.

Means are provided to cause carriage motor 53 (and carriage 21) to automatically slow down and then stop as the carriage approaches the extreme limits of travel in either raise or lower directions. As FIGS. 2 and 11F show, such means comprise four limit switch devices 17LS, 18LS, 19LS and 20LS which control relay coils 5LR, 6LR, 7LR and 8LR, respectively. These four limit switches are similar in construction and mode of operation to the limit switches 13LS, 14LS, 15LS and 16LS, hereinbefore described, but effect different control functions. The limit switches 17LS, 18LS, 19LS and 20LS, as FIG. 2 shows, are mounted on mast 27 of bridge 19 and cooperate with vanes on the surface of a control box 94 which is mounted on carriage 21 facing and closely adjacent to the surface of mast 27. Limit switch 17LS effects full or final stop of carriage 21 and is at the extreme upper end of mast 27. Limit switch 18LS effects carriage slowdown in the upper direction and is slightly lower than vane 96 on mast 27. Limit switch 19LS effects carriage slowdown in the lower direction and is located near the lower end of mast 27. Limit switch 20LS effects full or final stop of carriage 21 and is at the extreme lower end of mast 27 and is slightly lower than vane 98.

A pushbutton 3PB is operable to move the carriage out of its emergency stop position at the top of the mast. Pushbutton 3PB and a pushbutton 10PB, hereinafter described, for jogging a skewed load are both physically located on the crane so that the crane operator must actually go there to check on crane conditions before he can operate these emergency pushbuttons. If, for example, the contacts freeze, relay 1LS causes the entire crane to be de-energized and requires resetting by pushbutton 3PB.

Means are provided to cause automatic braking of carriage motor 53 whenever it is de-energized and includes brake coil 67 in FIG. 11 and its associated circuitry. When brake coil 67 is de-energized it allows a spring-biased mechanical brake (not shown) to set. The brake means also comprise dynamic braking means, including a static stepless magnetorque control, which operates to effect rapid motor deceleration prior to setting of the mechanical brake.

Means are provided to accurately position carriage 21 adjacent any one of the horizontal rows of storage stations in the racks 1 and 3 either in "store level" or at a "retrieve level". In practice, the store level is a position at any one of the storage stations where the upper surface of shifter 23 is anywhere from one to about four inches above the upper surface of the load supports 9 for that station. The retrieve level is a position at any one of the storage stations where the upper surface of shifter 23 is anywhere from about one to four inches below the upper surface of the load supports 9. The distance is selected to fit crane usage conditions and is adjustable by moving vanes 100 and 102, hereinafter referred to. Such positioning means comprise limit switch device 23 LS for the store level and limit switch device 22ALS and 22BLS for the retrieve level which control the relays 12LR and 11LR, respectively, as well as the lights B (lines 115 and 116A in FIG. 11F). The limit switches 23LS, 22ALS and 22BLS which are mounted on the surface of control box 94 on carriage 21 are similar to the limit switches 13LS through 16LS, hereinbefore described, as regards construction and mode of operation but, of course, perform different functions. The limit switches 23LS and 22ALS and 22BLS are controlled by sets of vanes 100 and 102, respectively, which are mounted on mast 27; each set opposite a horizontal row of storage stations. For example, on mast 27 opposite or in line with row 5 of the storage stations, there is provided a group or set of two vanes 100 and 102 which effect limit switch operation as the carriage approaches and becomes properly positioned with respect to that particular row. When carriage 21 is opposite the retrieve level, switch 22ALS and 22BLS are operated by vane 102 to illuminate light B and energize relay coil 11LR (line 115 in FIG. 11F). In the manual mode, illumination of light B (line 115) indicates the fact of correct positioning to the crane operator. If desired, the crane operator can then stop movement of carriage 21 and be assured it will be at a desired level. When carriage 21 is opposite the store level, switch 23LS is operated by vane 100 to illuminate light B and energize relay coil 12LR (line 116 in FIG. 11F). Again illumination of light B (line 116) indicates the fact of correct positioning to the crane operator so that he can stop carriage movement. If the crane is being operated in the automatic or semi-automatic mode, energization of either relay coil 11LR or 12LR effects closure of their respective contacts in the automation controller (FIG. 11H) and the carriage either stops at or by-passes a particular horizontal row, depending on the address instructions in the diode matrix. Switch 23LSX is used to perform a special control function at the home station only.

Multiposition Shifter Movement

In crane 17 means are provided for controlling shifter motor 55 to move shifter 23 from its centered position on carriage 21 in either the right or left direction (with respect to FIG. 2) to any one of three positions in the direction chosen and to return the shifter to centered position. Shifter 23 normally moves at full speed and is slowed down automatically as it approaches the chosen extended position and the centered position. As hereinbefore mentioned and hereinafter explained, the shifter of crane 117 is movable to only one position in a storage station.

As FIG. 11A shows, such means comprise shifter motor right contacts 3MR (controlled by coil 3MR at line 201) and shifter motor left contacts 3ML (controlled by coil 3ML at line 200). The contactors 3MR and 3ML are controlled by the relay coils 8CR and 7CR. FIG. 11D and the latter are controlled by shifter pushbutton controls, appropriately labeled and shown in FIG. 11D. The speed of shifter motor 55 is controlled by motor accelerator contactors 1A, 2A, 3A and 4A and the contacts therefor shown in FIG. 11C and relay coil 1A shown in FIG. 11A.

Means are provided to cause automatic braking of motor 55 whenever it is de-energized and includes brake coil 106 in FIG. 11A and its associated circuitry. When brake coil 106 is de-energized it allows a spring-biased mechanical brake (not shown) to set. The brake means also comprises dynamic braking means, including the coil AS and the contacts AS, which operate to effect rapid motor deceleration prior to setting of the mechanical brake by operating a static stepless magnetorque control.

Means are provided to control the extent and speed of shifter travel in either direction and to control its return to centered position. As FIG. 11D shows, such means comprise a plurality of electromechanical limit switches designated with the prefix 4LS which are understood to be mounted on carriage 21 and on shifter 23 in appropriate locations. These limit switches and combinations of them control relays designated 9CR through 15CR in FIG. 11D.

A limit switch LS for controlling a load present relay 18CR (line 87 of FIG. 11E) and an empty shifter indicator relay 17LR (line 121 of FIG. 11F) is provided on shifter 23, as shown in FIG. 10 in connection with another shifter 123 for crane 117.

In a typical shifter operation, as FIG. 11D makes clear, direction of movement of shifter 23 from centered position is controlled by the shifter left pushbutton 6PB or by the shifter right pushbutton 8PB. Use of either of these pushbuttons alone, effects one-third extension of shifter 23. Use of either pushbutton 9A-PB or 9B-PB in conjunction with pushbuttons 6PB and 8PB effects either two-thirds or full extension of shifter 23, as shown in FIG. 11D.

Referring to FIGS. 1 and 7, means are provided on crane 17 for ascertaining whether a load is properly disposed thereon and for stopping or preventing operation of bridge motor 41 (and bridge 19) and carriage motor 51 (and carriage 21) if it is not. Such means comprise two light sources 106 and 108 and two photoelectric cells or receivers 110 and 112 disposed on the right side of carriage 21 (shown in FIG. 2) and similar pairs of light sources and receivers which are understood to be mounted on the opposite side of the carriage. Since the arrangements are similar, only that for the right side of carriage 21 is hereinafter described in detail. The light sources 106 and 108 are disposed in spaced apart relationship near the bottom of carriage 21 and the receivers 110 and 112 are disposed in spaced apart relationship near the top of the carriage. When energized, light source 106 projects a light beam 107 toward receiver 112 and light source 108 projects a light beam 109 toward receiver 110. Positioning of the light sources below the receivers reduces the chance of ambient overhead light from affecting receiver operation. Each beam 107 and 109 is angularly disposed in a direction which is transverse to the direction of movement of bridge 19 (i.e., horizontal) and the direction of movement of carriage 21 (i.e., vertical). Thus, the beams 107 and 109 intersect in a vertical plane which is at, or preferably just beyond, the right side edge of shifter 23, when the latter is centered.

Interruption of either light beam 107 or 109 by a load improperly positioned on shifter 23 (and thus in a position to cause damage to itself, a storage rack or the crane effects opening of normally closed contacts of a photoamplifier 2CRE (FIG. 11E line 83), energization of relay 16CR and light G and de-energization of bridge motor 41 and carriage motor 51. However, the crane operator can override the operation of relay 16CR by means of bypass pushbutton 10PB in line 91 of FIG. 11E.

Bin Condition Sensing Means

Referring to FIGS. 7, 8, 9, 10 and 12 probe means are provided on crane 117 (which is a modified version of crane 17) for sensing whether the single storage position in a storage station is already loaded and for preventing lateral movement of the shifter 123 if it is. It is to be understood that the probe means operate only in the automatic or semi-automatic mode and not in the manual mode. The probe means comprises two probe units 150 and 152, which are located on the right and left sides, respectively, of shifter 123. Probe unit 150, which is understood to be identical in construction and mode of operation to probe unit 152, comprises an actuator device, such as a conventional linear motor 154, which is mounted on shifter 123 beneath the surface thereof. Linear motor 154 has a probe 156, in the form of a cylindrical metal tube 158 with a plate 160 affixed to the end thereof. Tube 158 is provided with collars 162 and 164 at either end which serve to limit probe travel. Collar 164 also operates limit switches 10LS and 12LS, respectively. Probe 156 has a fully retracted position, shown in FIG. 10, wherein it maintains single pole, double throw limit switch 10LS (FIG. 12, line 85) in one condition wherein a relay coil 23 CR is energized. Probe 156 has a fully extended position shown in phantom view in FIG. 10 (and in practice a full travel of about five inches) toward which it moves when linear motor 154 is energized in the forward direction wherein it allows limit switch 10LS to assume another condition and wherein it effects a change in condition of a single pole, single throw limit switch 12LS (FIGS. 10 and 12) whereby a relay coil 36CR, shown in FIG. 12, is energized. Energization of relay coil 26CR causes an indication that a storage station is empty and permits shifter 123 to commence its storage movement. Energization of relay coil 26CR also effects reverse energization of linear motor 154 and retraction of probe 156. In the event the storage station selected is already occupied by a load, probe 156 is unable to reach its fully extended position and does not trip switch 12LS. Therefore, after a predetermined interval of time, a time delay relay 2TR (FIG. 12, line 80) is energized to effect reverse energization of linear motor 154 and retraction of probe 156. Energization of relay 2TR prevents any movement of shifter 123 toward the storage station. Energization of relay 2TR also causes an indication that the storage station is full. A pushbutton switch 10PB shown at line 91 FIG. 11E is operable to permit operation in the manual mode to correct a skewed or improperly positioned load by jogging.

Operation

The following is a description of a typical cycle of operation of crane 17 in both the manual and automatic mode. Semi-automatic operation is similar to automatic operation. In this description, typical operations of certain features found on crane 117, but not on crane 17, will also be described, where appropriate. In connection with the description of operation of crane 17, assume that the crane is at its home station and has a load 15, properly disposed thereon, which is to be delivered to position 13 in storage station 7 in column 1, row 10 in the manual mode or in the automatic mode. For automatic operation this address is programmed into the automation controller. Further assume that the control system shown in FIG. 11 through 11H (and that shown in FIG. 12 for crane 117) is energized by closure of main line safety switch 60, and by closure of line contactor C1, by closure of the circuit breakers 62, 63 and 64, and that it is placed in readiness for manual or automatic operation by positioning of selector switch 5PB (FIG. 11B, lines 5, 6, 9 and 10) on "hand" or "auto," respectively.

Bridge motor 41 is then energized for operation (manually or automatically) in the forward direction at a desired speed (slow, medium or full), to move crane 17 from its home station to a position adjacent column 1.

As crane 17 approaches column 1, magnet 78 approaches the vicinity of reed switch device 80 for column 1 and causes the latter device to close. In the manual mode this causes the indicator light to go on and signal the operator. In the automatic mode this causes the light to go on and also effects automatic slow-down of bridge motor 41. As crane 17 moves to proper position with respect to column 1, the light beam from light source 86 on control box 69 is reflected from reflector device 88 for column 1 to sensor 3CRE. This energizes coil 9LR and effects illumination of the signal light which indicates this fact. In the manual mode the operator then de-energizes bridge motor 41 to stop bridge 19 in proper position with respect to column 1. In the automatic mode, bridge 19 would stop automatically when coil 9LR is energized because of the address programmed in the automation controller.

Carriage motor 53 is then energized in the hoist direction at full speed to move carriage 21 from its lowest position on bridge 19 to a position adjacent row 10. Again, this is done manually or automatically, depending on the mode selected and the programmed address in the automation controller.

As carriage 21 approaches row 10, vane 97 causes limit switch 18LS to close and effect energization of coil 6LR. In the manual mode this has no effect but in the automatic mode it effects automatic slowdown of carriage 21. As carriage 21 moves to exact store level, vane 102 causes limit switch 23LS to close and effect energization of coil 12LR and illumination of signal light B (FIG. 11F, line 116A) which indicates this fact. In the manual mode the operator then de-energizes carriage motor 53 to stop carriage 21 in proper store position with respect to row 10. However, such stoppage takes place automatically in the automatic mode.

Shifter motor 55 is then energized manually or automatically for extension in the left-hand direction (with respect to FIG. 2) at normal speed to move shifter 23 to fully extended position so that load 15 may be deposited at position 13.

As shifter 23 moves past positions 11 and 12 it opens limit switches 4LS1 and 4LS2 but this does not cause de-energization of shifter motor 55 because these limit switches are shunted by the closed contacts 24CR and 25 CR, respectively. However, as shifter 23 approaches position 13 it closes limit switch 4LS9 to cause shifter motor 55 to slow down. When shifter 23 reaches its extreme left-hand or fully extended position, it causes limit switch 4LS3 to open to de-energize shifter motor 55.

When shifter 23 has stopped, carriage motor 53 is energized manually or automatically to lower carriage 21 (and fully extended shifter 23) from store level to retrieve level. As this occurs, load 15 comes to rest at position 13 and shifter 23 disengages from the load. As shifter 23 reaches retrieve level, vane 100 causes limit switches 22ALS and 22BLS to close and effect energization of coil 11LR and illumination of signal light B which indicates this fact. In the manual mode the operator then de-energizes carriage motor 51 to stop descent of carriage 21. This occurs automatically in the automatic mode.

When carriage 21 is stopped, shifter motor 55 is energized manually or automatically for retraction in the righthand direction (with respect to FIG. 2) at normal speed to return the shifter to centered position. As shifter 23 approaches centered position from the left, limit switch 7LS opens to cause motor 55 to slow down. At centered position, limit switch 6LS closes to stop shifter motor 55.

When shifter 23 is centered, carriage 21 may be lowered manually or automatically and crane 17 returned either to home station or to another storage station to retrieve a load thereat.

If crane 17 is to retrieve another load from a station and either store it at any one of three positions at another station or deliver it to the home station, operation of bridge 14, carriage 21 and shifter 23 are carried out as hereinbefore described (with different limit switches brought into play as required), except carriage 21 is stopped at the retrieve level (instead of the store level) and shifter 23 is extended to the desired position at retrieve level after which carriage 21 is raised to store level to pick up the load. Shifter 23 is then retracted at store level, with a load thereon, to centered position and crane 17 is moved as desired.

In operations involving crane 17, interruption of one of the light beams 107 or 109 causes de-energization of, or prevents energization of bridge motor 41 and carriage motor 53, until the load is properly positioned. However, if the crane operator determines that crane 17 can safely be moved, even though a load is skewed and projects slightly beyond the edge of the carriage, this can be accomplished by depressing bypass switch 10PB (FIG. 11E, line 91). This features is provided to enable operator to straighten the skewed load.

Furthermore, in operations involving crane 117 the shifter of this pallet-type crane is movable to only one position in a storage station and the probes 150 and 152 operate only if the crane 117 is being operated in the automatic (and not the manual) mode. In the automatic mode, when the carriage has arrived at the desired storage station, prior to movement of the shifter, the appropriate probe unit 150 or 152 and its probe extends to determine if the desired station is empty and able to receive another load (or if a load can be retrieved therefrom). If the station is empty, the probe extends fully to indicate this fact. If the station is full, the probe extends only part way, and after a short interval is retracted and causes an indication of the fact that the bin is full.

We claim:

1. In an automatic warehouse system; at least one stationary load storage rack having a plurality of load storage stations arranged in horizontal rows and vertical columns, each station having a plurality of load storage positions; a movable load carrier for moving a load between any two storage positions and between any storage position and a home station, said load carrier comprising a horizontally movable bridge, said bridge being movable along a path adjacent said vertical columns and comprising at least one upright mast extending adjacent said horizontal rows, said mast having spaced apart actuator vanes thereon, a vertically movable carriage mounted on said bridge, said carriage being movable along a path adjacent said mast, and at least one laterally movable shifter mounted on said carriage; individual electric motors for driving said bridge, carriage and shifter; support means adjacent said storage rack along the path of movement of said bridge; actuator vanes, spaced apart reflectors and magnetic slowdown switches on said support means, and control means selectively operable in either the manual or automatic mode to operate said motors to control movement of said load carrier, said control means comprising manually operable control switches for use in said manual mode to selectively operate said motors and said control means also comprising an automation controller for use in said automatic mode and programmable to operate said motors in predetermined sequence, said control means further comprising: first sensing means including a light source and photoresponsive switch means on said carriage for sensing whether a load is properly disposed on said shifter and for preventing operation of the bridge and carriage motors to prevent bridge and carriage movement if it is not; first means for accurately positioning the bridge adjacent a particular vertical column of storage positions, said first means comprising a magnet on said bridge for operating said spaced apart magnetic slowdown switches on said support means and a light source and a photoresponsive stop switch on said bridge operable by said spaced apart reflectors on said support means, said magnetic switches of said first means operable to provide signals indicative of bridge position when said control means are in the manual mode and to effect operation of said bridge motor when said control means are in the automatic mode; second means for accurately positioning the carriage adjacent a particular horizontal row of storage stations, said second means comprising a magnetic store switch and a magnetic retrieve switch on said carriage, each operable in response to said spaced apart actuator vanes on said mast, said magnetic switches of said second means operable to provide signals indicative of carriage position when said control means are in the manual mode and to effect operation of said carriage motor when said control means are in the automatic mode; second bin detector sensing means on said shifter operable prior to extending movement of said shifter for sensing whether a particular storage position is alreacy occupied; bridge travel limit switch means to prevent horizontal travel of said bridge beyond prescribed limits, said bridge level limit switch means comprising slowdown and stop magnetic switches on said bridge operable by said actuator vanes on said support means; and carriage travel limit switch means to prevent vertical travel of said carriage beyond limits, said carriage travel limit switch means comprising slowdown and stop magnetic switches on said carriage operable by said actuator vanes on said mast.

2. A system according to claim 1 including a first control box on said bridge on which are mounted said magnet, said light source and said photoresponsive stop switch of said first means and said magnetic switches of said bridge travel limit switch means; a second control box on said carriage on which are mounted said magnetic switches of said second means and of said carriage travel limit switch means; each of said magnetic switches on said first and second control boxes being provided with a permanent magnet in spaced apart relationship therefrom; and wherein said vanes for operating said magnetic switches take the form of magnetically permeable members.

3. A system according to claim 2 including a pair of stationary load storage racks disposed on opposite sides of the path of travel of said movable load carrier, wherein said shifter is movable laterally from opposite sides of said carriage, and wherein said support means are located between one of said load storage racks and said path of travel of said movable load carrier.

4. A system according to claim 3 wherein said bridge is provided with a pair of spaced apart upright masts and wherein said actuator vanes for said second means and said carriage travel limit switch means are located on one of said masts.

5. A system according to claim 4 wherein said support means is disposed between said storage rack and the path of travel of said carriage and comprises at least one horizontal rail, and wherein said vanes mounted on said rail and on said mast take the form of L-shaped members.

* * * * *